United States Patent
Bowles

(10) Patent No.: US 8,370,870 B2
(45) Date of Patent: Feb. 5, 2013

(54) METHOD AND SYSTEM FOR COMPENSATING VIEWERS OF CONTENT

(75) Inventor: Bryan F. Bowles, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 241 days.

(21) Appl. No.: 11/756,510

(22) Filed: May 31, 2007

(65) Prior Publication Data

US 2007/0283398 A1 Dec. 6, 2007

Related U.S. Application Data

(60) Provisional application No. 60/810,546, filed on Jun. 1, 2006.

(51) Int. Cl.
*H04N 7/16* (2011.01)

(52) U.S. Cl. ............... 725/23; 725/32; 725/33; 725/34; 725/35; 725/36

(58) Field of Classification Search .................. 725/23, 725/32–36; 705/14, 14.1, 14.11–14.16, 14.19
See application file for complete search history.

(56) References Cited

U.S. PATENT DOCUMENTS

| | | | |
|---|---|---|---|
| 6,766,524 B1 * | 7/2004 | Matheny et al. ............... | 725/23 |
| 2002/0019769 A1 * | 2/2002 | Barritz et al. .................. | 705/14 |
| 2002/0042733 A1 * | 4/2002 | Lesandrini et al. ............ | 705/10 |
| 2002/0087400 A1 * | 7/2002 | Khoo et al. .................... | 705/14 |
| 2002/0133817 A1 * | 9/2002 | Markel .......................... | 725/23 |
| 2003/0149618 A1 * | 8/2003 | Sender et al. ................... | 705/14 |
| 2004/0186774 A1 * | 9/2004 | Lee ................................ | 705/14 |
| 2004/0204991 A1 * | 10/2004 | Monahan et al. .............. | 705/14 |
| 2004/0221303 A1 * | 11/2004 | Sie et al. ........................ | 725/29 |
| 2006/0015404 A1 | 1/2006 | Tran | |
| 2006/0100923 A1 | 5/2006 | Courchesne | |

OTHER PUBLICATIONS

Cooper, William, "BT Vision broadband video service review," internet article: http://informitv.com/opinion/2006/12/btvisionbroadband/, first printed Feb. 13, 2007, 5 pages, www.informitv.com.
CNN.Com, "CNN.com launces broadband video news service," internet article: http://cnn.com/2005/TECH/internet/12/05/pipeline/index.html, first printed Feb. 13, 2007, 2 pages, www.cnn.com.
Shields, Mike, "Comedy Unveils Motherload Net," internet article: http://mediaweek.com/mw/news/recent_display.jsp?vnu_content_id=1001351483, first printed Feb. 13, 2007, 2 pages, www.mediaweek.com.
Wikipedia, "MTV Overdrive," internet article: http://en.wikipedia.org/wiki/MTV_Overdrive, first printed Feb. 13, 2007, 2 pages, www.wikipedia.org.
Wikipedia, "Video on demand," internet article: http://en.wikipedia.org/wiki/Video_on_demand, first printed Mar. 23, 2007, 5 pages, www.wikipedia.org.

* cited by examiner

*Primary Examiner* — Pankaj Kumar
*Assistant Examiner* — Alazar Tilahun
(74) *Attorney, Agent, or Firm* — Fitch, Even, Tabin & Flannery, LLP

(57) ABSTRACT

A method and system for use in providing content to a viewer that includes providing a service comprising an on demand video service to the viewer wherein the viewer has an option to view video content. The system is configured to compensate the viewer a reward for having viewed the video content, and the system maintains an accounting of the reward and corresponding viewer identification.

16 Claims, 4 Drawing Sheets

METHOD AND SYSTEM FOR COMPENSATING VIEWERS OF CONTENT

CROSS-REFERENCE TO RELATED APPLICATIONS

This application claims the benefit of U.S. Provisional Patent Application No. 60/810,546, filed Jun. 1, 2006, entitled "COMPENSATING TV VIEWERS," the entire disclosure of which is hereby incorporated herein by reference in its entirety.

BACKGROUND OF THE INVENTION

1. Field of the Invention

Embodiments of the present invention relate generally to the presentation of content to viewers, and more specifically to schemes for attracting viewers to such content.

2. Discussion of the Related Art

Video-on-demand (VOD) systems allow users to select and watch video content at their convenience so that they do not need to wait for the content to be played on a fixed schedule. Viewers may use a VOD requesting system, such as a set-top box, personal computer (PC), etc., for requesting specific content. Content providers may provide content to the requesting system either by "streaming" or by allowing the user to "download" the content to the requesting system. Streaming the content allows the viewer to view the content in real-time, whereas downloading allows the viewer to download and store the content on the requesting system. With downloading, a viewer may be allowed to view the content at a later point in time as he or she desires. Downloading and streaming content on a VOD system often provides the user navigational capabilities, such as pause, fast forward, rewind, etc.

Content providers may provide content via a content server coupled to a local area and/or wide area network. The content server may also be placed at a cable head-end serving a particular market, as well as cable hubs in larger markets. Content providers typically provide the content in a pay per usage scheme, for example, and/or a flat rate per time frame scheme.

It is with respect to these and other background information factors that the present invention has evolved.

SUMMARY OF THE INVENTION

One embodiment provides a method for use in providing content to a viewer, comprising providing a service comprising an on demand video service to the viewer wherein the viewer has an option to view video content. The viewer is compensated a reward for having viewed the video content, and an accounting is maintained of the reward and corresponding viewer identification.

Another embodiment provides a system for use in providing content to a viewer, comprising: a server; a receiver coupled to the server, wherein the server is configured to provide a service comprising an on demand video service, and wherein the receiver is configured to receive the content; a monitor coupled to the receiver, the receiver configured to display the content to the viewer, wherein the viewer has an option to view the content; the server further configured to compensate the viewer a reward for having viewed the video content and is configured to maintain an accounting of the reward and corresponding viewer identification.

Another embodiment provides a storage medium storing a computer program executable by a processor based system, the computer program causing the processor based system to execute steps comprising: providing a service comprising an on demand video service to the viewer wherein the viewer has an option to view video content; compensating the viewer a reward for having viewed the video content; and maintaining an accounting of the reward and corresponding viewer identification.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Some of the embodiments of the present invention provide various schemes for rewarding viewers with "points" or other incentives or compensation for consuming or experiencing content on a service, such as a broadband video service. These points may be accumulated in a "bank" for the viewer to redeem at a later date on various products and services.

Figure 1:
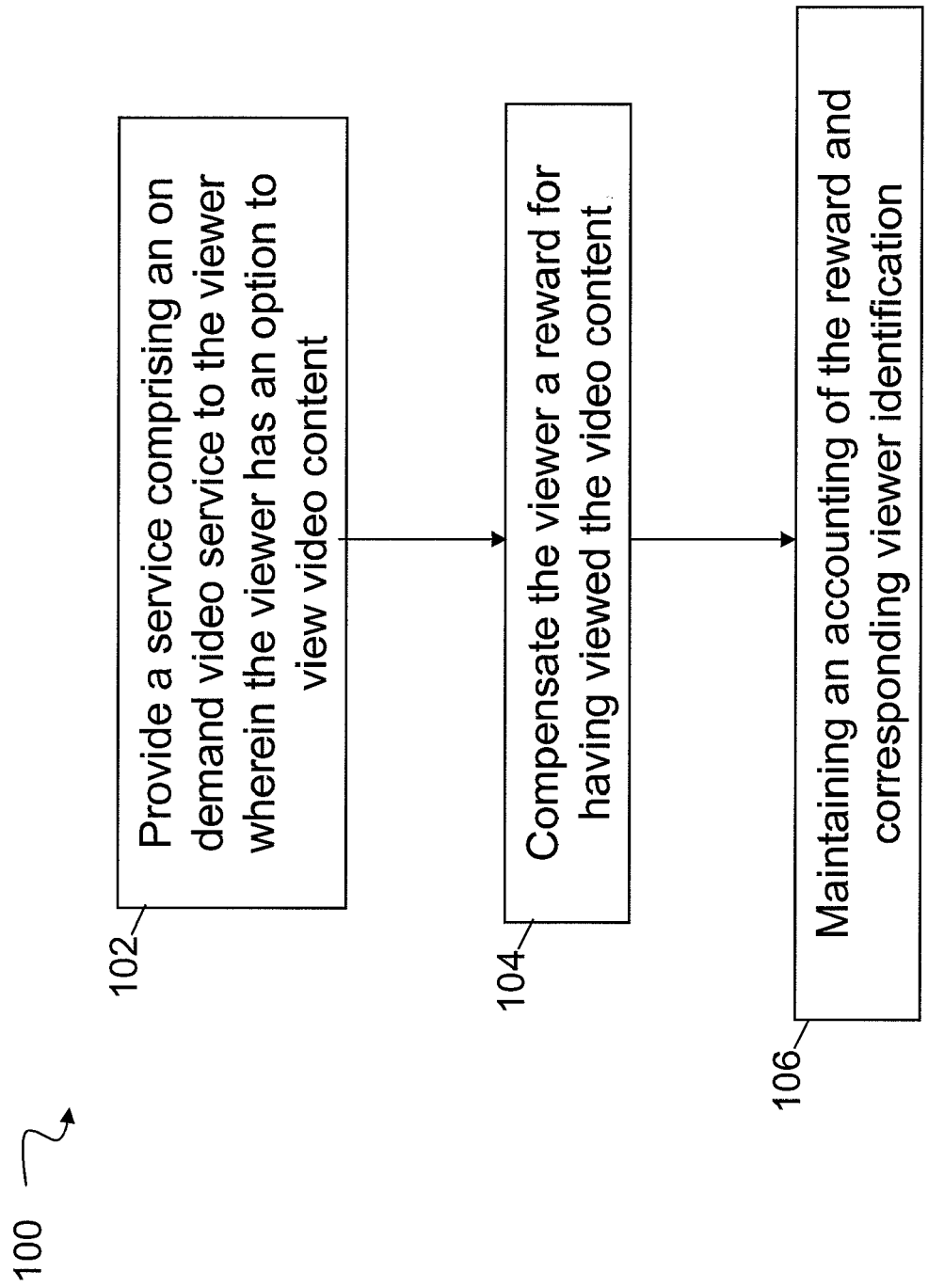
FIG. 1 is a flow diagram illustrating a method for use in compensating viewers of content in accordance with an embodiment of the present invention.

For example, referring to FIG. 1 there is illustrated a method 100 that operates in accordance with an embodiment of the present invention. The method 100, which may be used in providing content to a user, begins in step 102 where a service comprising an on demand video service is provided to a viewer or other type of user. With this service the viewer may have the option to view video content.

In some embodiments, the service may comprise a broadband video service. Such broadband video service may be implemented by hosting a website on a server coupled to a network such as a local and/or wide area network. The network, for example, may comprise, the Internet, a satellite system and/or a cable television system using a requesting system. A requesting system, for example, may comprise a computer or a set-top box in a viewer's home or office that may provide an interface allowing the viewer to navigate or choose which content he or she wants to view. Various alternatives in this regard will be discussed below.

By way of example, the service may offer viewers access to an extensive selection of new and classic hit movies and TV series, foreign films and TV series, other hard-to-find video content, etc. In some embodiments, original content produced specifically for the service, short form content, niche programming, etc., may also be offered.

In some embodiments, the service may also offer other "online community" services and content that the viewer may experience, such as, chat rooms, message boards, user rankings, blogs, celebrity guest chat, online games, background information, etc. Furthermore, the service may license some video content on a non-exclusive basis and as a result, some of the content available on the service may also be available on other broadband video services made available by the same provider or other providers.

In some embodiments, the service may be provided to the viewer for no cost (i.e. free) or as part of a promotion. In some embodiments, the service may be provided to the viewer for a fee, such as a monthly fee, or on some other terms, such as part of a subscription or the like.

In step 104, the viewer is compensated a reward for having viewed and/or experienced the video content through the service. For example, the service may compensate or reward its viewers with "points," coupons, or some other incentive or compensation that can be used to purchase or receive discounts on various products and services. It is believed that such rewards will entice potential customers to view the programming on the broadband video service or other service rather than a competitor. In some embodiments, the more time a viewer spends watching video or navigating the service, such as by navigating a website hosted by the service, the more he or she will be compensated. In some embodiments, the viewer is compensated for viewing one or more defined types of content (e.g., at corresponding rates), such as for viewing advertisements inserted between segments of a program or movie and for viewing previews before a movie begins. Advertisements can take various forms depending on the type of content or video being accessed, such as video, text, audio, pop-ups, etc.

Some of the embodiments of the present invention involve rewarding viewers or other users with points or other incentives for consuming or viewing any type of content on a broadband video service. That is, in some embodiments the viewer is rewarded not only for viewing advertisements but also for viewing any of the other types of content provided, such as movies, TV shows, etc. For example, in some embodiments viewers may also be compensated for viewing/participating in or accessing an online community, such as chat rooms, message boards, user rankings, blogs, celebrity guest chat, games (online or offline), background information of the videos being viewed, audio, demos (e.g., software or previews), documents, downloads, etc.

In step 106, the service may maintain an accounting of the reward and corresponding viewer identification. For example, in some embodiments in order to receive the reward, incentive, or other compensation, viewers or other customers may be required to fill-out a personal information sheet giving the provider of the broadband video service access to extensive demographic or other personal information on each user. Such information could be valuable to advertisers interested in sending out targeted messages to specific user groups. In some embodiments, this information may be sold to such advertisers. In some embodiments, the viewer is compensated different amounts depending on the amount of personal information provided to the service, or permitted by the viewer to be collected.

In some embodiments, the service may collect navigation information on users. By way of example, such navigation information may include, but is not limited to, what content the users watch and where they spend their time on the service, such as where they spend their time on a website hosted by the service. In some embodiments, the service may collect automated information about the viewer, such as a machine identifier, time, GPS data, or account information. It is believed that such information may help advertisers and/or others create targeted messages for specific user groups.

Figure 2:
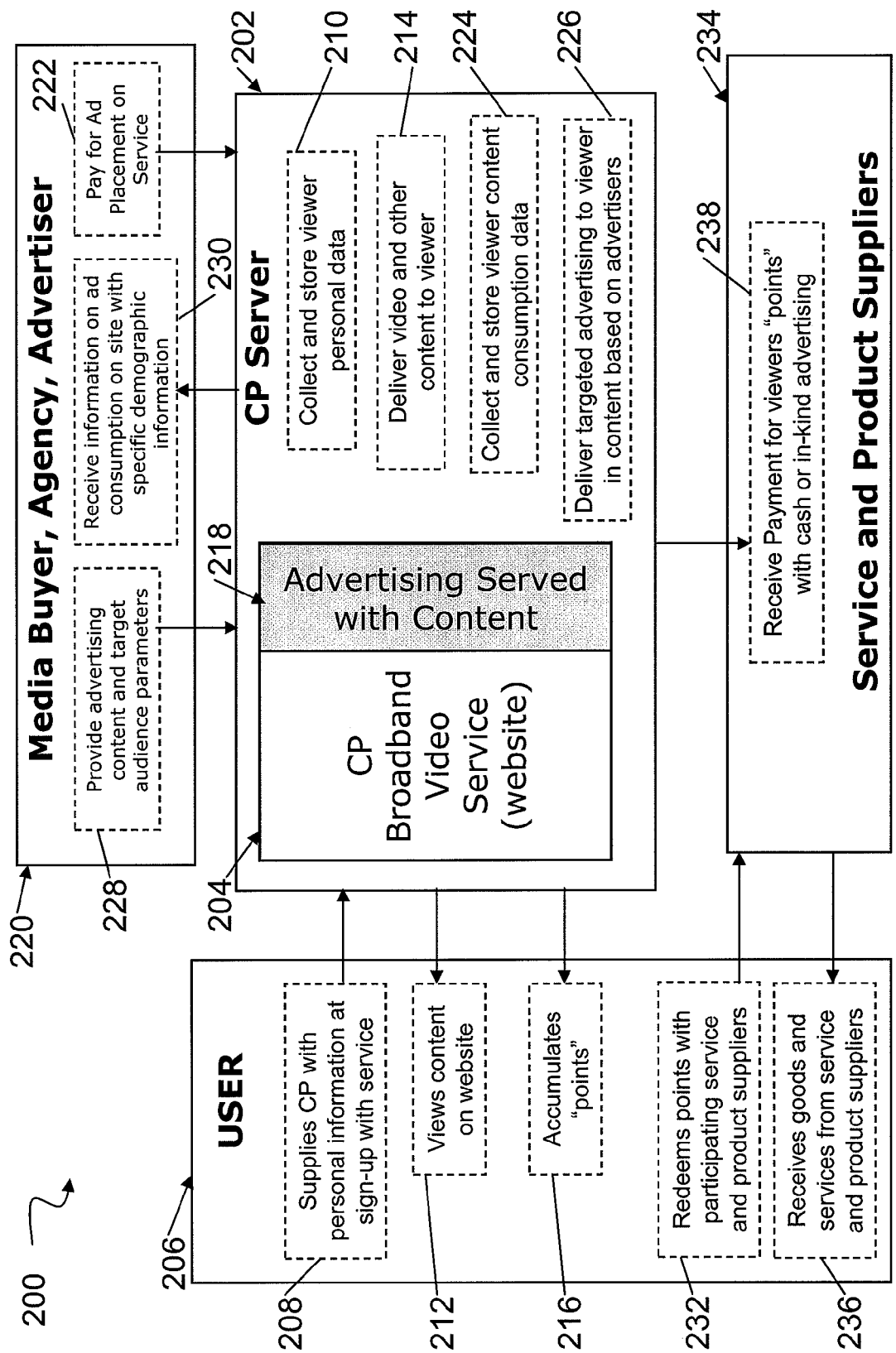
FIG. 2 is a block diagram illustrating an example process flow and implementation in accordance with an embodiment of the present invention.

Referring to FIG. 2, there is illustrated an example process flow 200 for a system implemented in accordance with an embodiment of the present invention. At the center is a content provider 202. In some embodiments, the content provider 202 comprises a server that provides a service, such as a broadband video service, by hosting a website 204. In some variations, the server of the content provider 202 is coupled to the Internet, and thus, the website 204 is hosted on the Internet. A user 206 may access the service, for example, by accessing the website 204 in order to request, view and/or experience the content on-demand. The user 206 may gain such access by operating a client device or other type of receiver, such as for example a computer, set-top box, entertainment system, hand-held device, etc. Such client devices or other types of receivers may include either a wired or wireless connection to the Internet or other network hosting the service.

By way of example, the user 206 accesses the website 204 to sign up for the service provided by the content provider 202. The website 204 may provide data fields wherein the user 206 supplies the content provider personal information and/or identification when signing up for the service, as indicated by block 208. The content provider 202 may collect and store the viewer's personal data in block 210, for example, within a database stored on, or accessed by, the server of the content provider 202.

Next, the user 206 may request to view content in block 212, e.g., a video on the website 204. The content provider 202 may deliver the video and other content to the viewer in block 214. In some variations of the present embodiment, the content provider 202 server may stream the video to the website 204 and/or may offer the user 206 the video for downloading onto a local system.

The user 206 will then receive and accumulate "points" in block 216. Examples of such points may be points for viewing or experiencing the content and/or may accumulate like cash in a bank wherein a certain number of points may be exchanged for products and/or services. Thus, the points may be used as rewards rewarded to users for using the service and may be used by the content providers to entice customers. The content provider 202 may be configured to maintain an accounting of the points or rewards earned by the user 206 and store the accounting of the rewards in connection with the user's personal information. Thus, the more content the user 206 views and/or experiences, the more rewards the user 206 will earn. In some embodiments, the points may be shared with or exchanged for points from an associated compensation program (e.g., miles from an airline frequent flyer program) that has created a relationship with the service.

In some embodiments, the website 204 may include or be associated with a block 218 for serving advertising with the content. The content provider 202 may serve advertising in block 218 along with the content requested by the user. The content provider 202 may receive payment for the advertisement, as indicated in block 222, from a media buyer, marketing agency and/or an advertiser 220 (generally referred to as advertisers 220). This scheme may allow the content provider 202 the ability to reduce the cost of the service for the user 206. Furthermore, enticing the user 206 with rewards to subscribe to the service may increase the number of customers, and thus, more advertisers 220 may want to purchase an advertisement slot on the website 204.

In some variations of the present embodiment, the content provider 202 may collect and store the user 206's content consumption data in block 224. This consumption data may be, for example, the type of content experienced by the user 206, the frequency of use of the service, and/or responses to advertisements served with the content. The consumption data may be used by the content provider 202 to deliver targeted advertising to viewers through block 218 along with the content, based on the advertisers and advertisements, as indicated in block 226.

In some variations, this consumption data may also be delivered to the advertisers 220. The advertisers 220 may choose and/or pay to receive additional information on ad consumption regarding the users viewing the advertisements on the website 204, as indicated in block 230. By way of example, the advertisers 220 may have the ability to track the effect of their advertisements by receiving feedback data. Such feedback data may include a count of how many users click on an icon on the website 204 for more information regarding the advertisement and/or how many users link to the advertiser 220's website from the content provider's website 204.

Additionally, the content provider 202 may supply the advertisers 220 with user personal information (provided when the user 206 signs up for the service) and/or other consumption data. Also, in block 228, the advertisers 220 may receive specific demographic information regarding the user 206, such as ages, genders, geographic locations, etc. This may provide the advertisers 220 the opportunity to develop more targeted advertising campaigns because they will have more information about the consumers that are seeing its advertisements. Therefore, the advertisers 220 may use the personal information and/or consumption data to provide targeted advertising content and target audience parameters to the content provider 202, as indicated in block 228. In some embodiments, the advertisers 220 may directly send advertisements to the website 204 that are targeted for a typical and/or specific user accessing the website 204.

Alternatively and/or additionally, the content provider 202 may be configured to use the consumption data and the target audience parameters supplied by the advertisers 220 in order to deliver targeted advertising to the website 204 in block 226. It is believed the user 206 is more likely to view more focused advertisements that individually or specifically appeal to him or her rather than advertisements geared toward a generic mass audience. Additionally, the content provider 202 may utilize the ability to collect user 206 personal information to attract advertisers 220 interested in sending targeted messages, and, thus, it is believed these advertisers 220 will be more inclined to pay for advertisement 218 on this service. Thus, such a system may provide an opportunity for the content provider 202 to sell the advertising slots for a premium value.

Continuing with the process flow 200 of FIG. 2, content provider 202 may be configured to provide the user 206, via the website 204, a redemption option for the rewards having been accumulated for viewing and/or experiencing content. Thus, the user 206 may access the website 204, or another website linked to the website 204, in order to redeem the points as payment towards purchasing a service and/or product. By way of example, the user 206 may contact participating service and product suppliers 234, either through the website 204, or other means. The user 206 may redeem points with the participating service and product suppliers in block 232 and then receive goods and services from the service and product suppliers in block 236. For example, the points accumulated may be redeemed for free and/or discounted rates for products or services.

By way of example, the content provider 202 may use this embodiment to promote it's own products and services. In other words, the content provider 202 may offer to the users 206 the opportunity to redeem the accumulated rewards, points and coupons for products and/or services provided by the content provider 202. For example, the content provider 202 may offer a newly released video for a discounted rate when the user 206 redeems a certain amount of points. Additionally or alternatively, for a redemption of points, the user 206 may be offered a popular or new product prior to others. Similarly, the content provider 202 may offer the user 206 the broadband video service at a reduced price with the redemption of points having been accumulated. In another aspect, the content provider 202 may provide different levels of access to its web services or different types of services for users 206 with appropriate amounts of points or in exchange for points.

In some variations of the present embodiment, the service and product suppliers 234 may be a separate but related entity or a completely independent entity from the content provider 202. In some variations, as indicated in block 238, the service and product suppliers 232 receive payment from the content provider 202 for viewer points having be redeemed, wherein the payment may, for example, include cash and/or payment in-kind with advertising slots on the website 204. By way of example, the service and product suppliers 234 may be the same entity as the advertisers 224 providing the advertisement 218. Thus, the user 206 may have the option to redeem the points or reward with the advertisers 224. Accordingly, the advertisers 224 may be reimbursed for the redemption of the reward with additional advertisement slots.

Additionally, in some variations, the server of the content provider 202 may be configured to collect information corresponding to the products and/or services having been purchased by the user 206 redeeming the points or reward.

Figure 3:
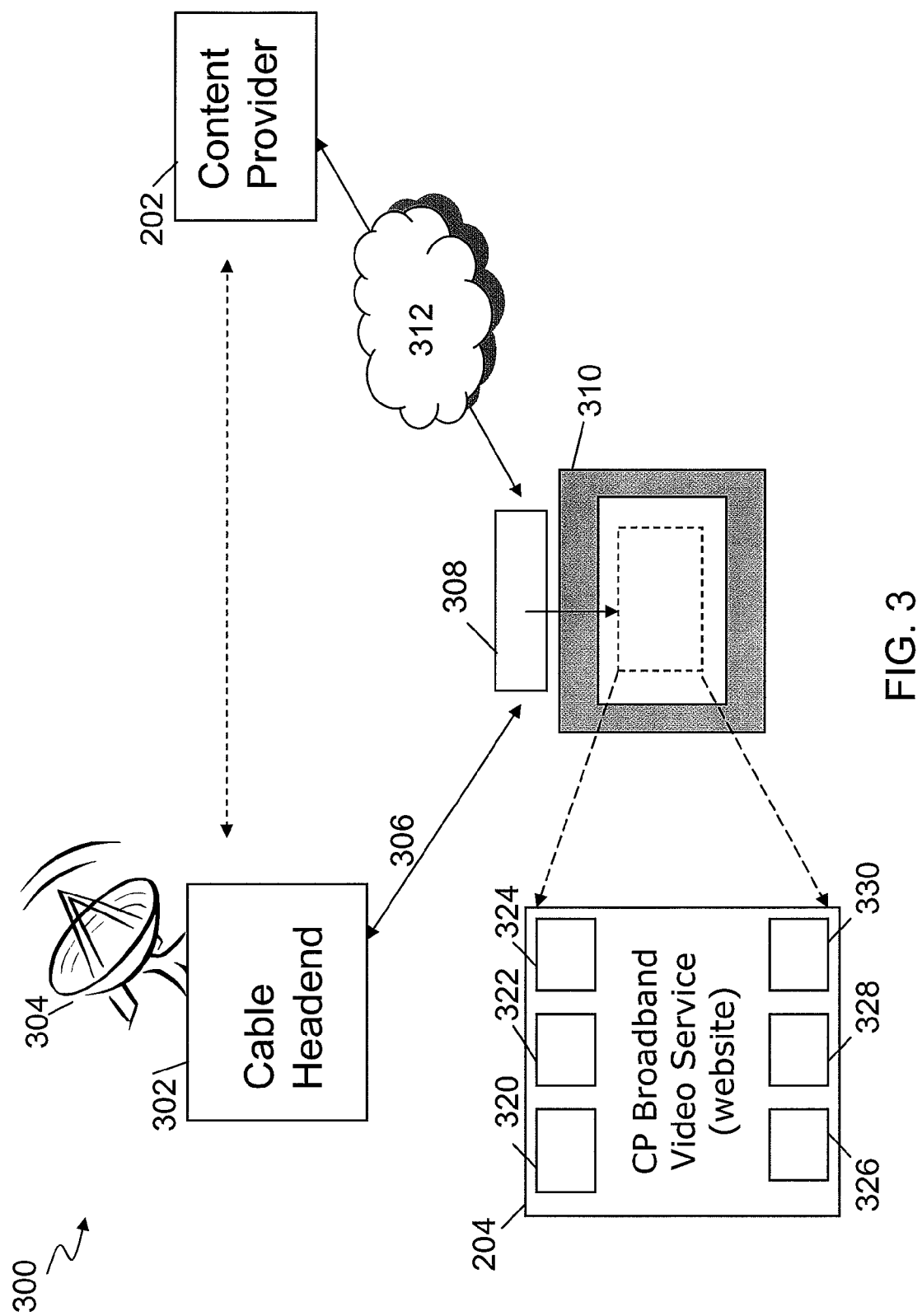
FIG. 3 is a block diagram illustrating an example implementation for compensating viewers of content in accordance with an embodiment of the present invention.

Referring next to FIG. 3, there is illustrated a block diagram of system 300 for compensating viewers of content in accordance with an embodiment of the present invention. By way of example, a cable headend 302 is configured to transmit content, for example, broadband video, via satellite 304 and/or over a cable transmission line or cable network 306. A receiver 308, coupled to the cable headend 308 via satellite 304 or the cable network 306, may be configured to receive the content and supply the content to a monitor 310 or viewing apparatus for the user to experience the content. The receiver 308, in some variations, may comprise a set-top box, a PC, or any device or client device configured to receive broadband video.

In some variations of the present embodiment, the receiver 308 may also be configured to receive content from a content provider 202 via a communication network 312, wherein the content provider 202 may comprise a server coupled to the communication network 312. Additionally, the communication network 312 may comprise, for example, the Internet. Furthermore, the cable headend 302 may be configured to communicate with the content provider 202.

As described above, in some variations, the content provider 202 may provide a service to the user viewing the content, and wherein, the service may comprise providing a website 204. Wherein, the service offered includes at least an on-demand video service, wherein the user may request to watch a video through the receiver 308. In some variations of the present embodiment, this service is offered via a website hosted by the content provider 202. After the user signs up with the content provider 202, the content provider 202 may reward the user for viewing an on-demand video and/or requesting to view content via the website 204.

In some embodiments, the service may include other content that may be experienced through the website 204. By way of example, the website 204 may include a link to a chat room 320 (e.g., a place designated and capable of instant messaging) and/or a window for remotely interacting with others. The website 204 may include message boards 322 and display user rankings 324 for those that have signed up for the service and/or for non-registered users. In some variations, the service may provide the user the ability to make and/or read blogs 326. Additionally, the service may provide a window or the ability to have celebrity guest chat sessions 328 and online games 330. Experiencing some or all of the services and/or content, in addition to viewing videos, may provide the user the opportunity to accumulate points.

Figure 4:
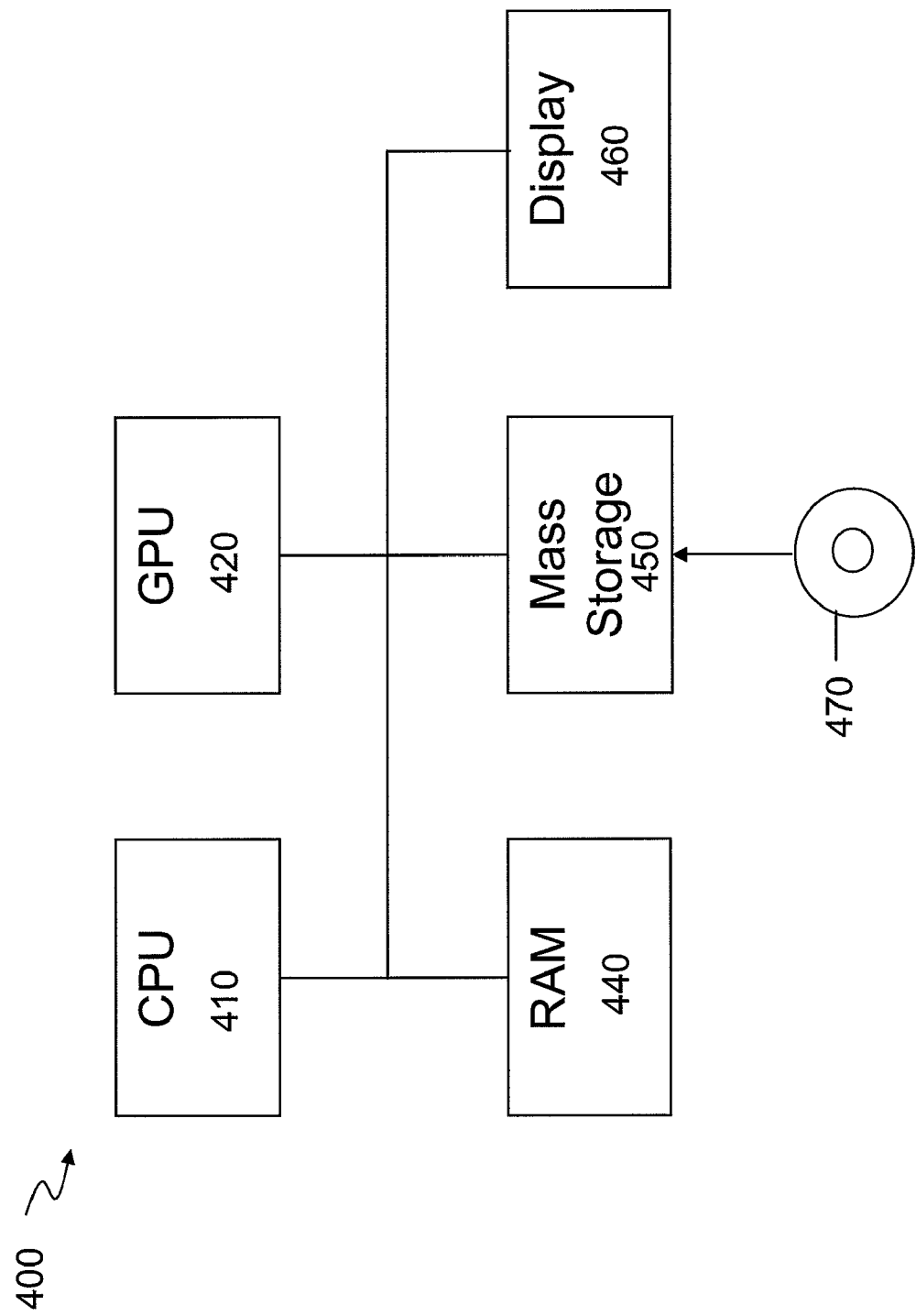
FIG. 4 is a block diagram illustrating a processor based system that may be used to run, implement and/or execute the methods and/or techniques shown and described herein in accordance with embodiments of the present invention.

The methods and techniques described herein may be utilized, implemented and/or run on many different types of computers, server computers and systems, graphics workstations, televisions, entertainment systems, video game systems, DVD players, DVRs, media players, home servers, video game consoles, and the like. Referring to FIG. 4, there is illustrated a system 400 that may be used for such implementations. Namely, the system 400 comprises an example of a processor based system that may be used to run, implement and/or execute the methods and/or techniques shown and described herein in accordance with embodiments of the present invention. However, the use of the system 400 is certainly not required.

By way of example, the system 400 may include, but is not required to include, a central processing unit (CPU) 402, a graphics processing unit (GPU) 404, a random access memory (RAM) 408, and a mass storage unit 410, such as a disk drive. The system 400 may be coupled to, or integrated with, a display 412, such as for example any type of display, including any of the types of displays mentioned herein.

The CPU 402 and/or GPU 404 may be used to execute or assist in executing the steps of the methods and techniques described herein, and various program content and images may be rendered on the display 412. Removable storage media 414 may optionally be used with the mass storage unit 410, which may be used for storing code that implements the methods and techniques described herein. However, any of the storage devices, such as the RAM 408 or mass storage unit 410, may be used for storing such code. Either all or a portion of the system 400 may be embodied in any type of device, such as any type of device mentioned herein.

In some embodiments the system 400 may be used for implementing all or portions of the content provider 202 (FIG. 2), a client device or other type of receiver operated by the user 206, and/or systems controlled or operated by the advertisers 220 and/or service and product suppliers 234.

While the invention herein disclosed has been described by means of specific embodiments and applications thereof, numerous modifications and variations could be made thereto by those skilled in the art without departing from the scope of the invention set forth in the claims.

What is claimed is:

1. A method for use in providing content to a viewer, comprising:
   providing a service comprising an on demand video service and an online community to the viewer, wherein the on demand video service provides the viewer an option to view a plurality of items of video content;
   collecting and storing viewer information including viewer information provided by the viewer;
   compensating the viewer, as determined based on an amount of information obtained for the viewer, a first reward for having viewed a first item of video content, wherein the first item of video content does not include an advertisement, and wherein compensation varies depending on the amount of information obtained for the viewer;
   compensating the viewer, as determined based on the amount of information obtained for the viewer, a second reward for accessing the online community;
   maintaining an accounting of the first and second rewards and corresponding viewer identification;
   providing the viewer a redemption option comprising redeeming at least one of the first and second rewards as payment towards purchasing at least one of a product and a service;
   serving an advertisement with content provided by the service; and
   the redemption option further comprising redeeming the at least one of the first and second rewards with a provider of the advertisement, and wherein the provider of the advertisement is reimbursed for the redemption of the at least one of the first and second rewards with additional advertisement slots.

2. The method of claim 1, wherein the service further comprises a website hosted on the Internet.

3. The method of claim 1, wherein the providing step further comprises: providing the on demand video service over a broadband network.

4. The method of claim 1, further comprising:
   collecting information corresponding to the at least one of the product or service having been purchased by the viewer redeeming the at least one of the first and second rewards.

5. The method of claim 1, wherein the online community comprises at least one of a chat room, a message board, a user ranking site, a blog, and a celebrity guest chat room.

6. A system for use in providing content to a viewer, comprising:
   a server;
   a receiver coupled to the server, wherein the server is configured to provide a service comprising an on demand video service and an online community, and wherein the receiver is configured to receive the content;
   a monitor coupled to the receiver, the receiver configured to display the content to the viewer, wherein the viewer has an option to view the content;
   the server further configured to:
      collecting and storing viewer information including viewer information provided by the viewer;
      compensate the viewer, as determined based on an amount of information obtained for the viewer, a first reward for having viewed a first item of video content from the on demand video service and compensate the viewer, as determined based on the amount of information obtained for the viewer, a second reward for accessing the online community, wherein the viewer is compensated the first reward even when the first item of video content does not include an advertisement, and is configured to maintain an accounting of the first and second rewards and corresponding viewer identification, and wherein compensation varies depending on the amount of information obtained for the viewer;
   wherein the server is further configured to provide the viewer a redemption option comprising allowing the viewer to redeem at least one of the first and second rewards as payment towards purchasing at least one of a product and a service;

wherein the server is further configured to serve advertisement with the content;

wherein the redemption option further comprises allowing the viewer to redeem the at least one of the first and second rewards with a provider of the advertisement; and wherein the provider of the advertisement is reimbursed for the redemption of the at least one of the first and second rewards with additional advertisement slots.

7. The system of claim 6, wherein the service further comprises a website hosted on the Internet.

8. The system of claim 6, wherein the server is further configured to provide the on demand video service over a broadband network.

9. The system of claim 6, wherein the server is further configured to collect information corresponding to the at least one of the product or service having been purchased by the viewer redeeming the at least one of the first and second rewards.

10. The system of claim 6, wherein the online community comprises at least one of a chat room, a message board, a user ranking site, a blog, and a celebrity guest chat room.

11. A non-transitory storage medium storing a computer program executable by a processor based system, the computer program causing the processor based system to execute steps comprising:

providing a service comprising an on demand video service and an online community to the viewer, wherein the on demand video service provides the viewer an option to view a plurality of items of video content;

collecting and storing viewer information including viewer information provided by the viewer;

compensating the viewer, as determined based on an amount of information obtained for the viewer, a first reward for having viewed a first item of video content, wherein the first item of video content does not include an advertisement, and wherein compensation varies depending on the amount of information obtained for the viewer;

compensating the viewer, as determined based the an amount of information obtained for the viewer, a second reward for accessing the online community;

maintaining an accounting of the first and second rewards and corresponding viewer identification;

providing the viewer a redemption option comprising redeeming at least one of the first and second rewards as payment towards purchasing at least one of a product and a service;

serving an advertisement with content provided by the service; and the redemption option further comprising redeeming the at least one of the first and second rewards with a provider of the advertisement, and wherein the provider of the advertisement is reimbursed for the redemption of the at least one of the first and second rewards with additional advertisement slots.

12. The storage medium of claim 11, wherein the service further comprises a website hosted on the Internet.

13. The storage medium of claim 11, wherein the providing step further comprises:

providing the on demand video service over a broadband network.

14. The storage medium of claim 11, further comprising:

collecting information corresponding to the at least one of the product or service having been purchased by the viewer redeeming the at least one of the first and second rewards.

15. The storage medium of claim 11, wherein the online community comprises at least one of a chat room, a message board, a user ranking site, a blog, and a celebrity guest chat room.

16. The method of claim 1, further comprising:

collecting personal information of the viewer; and charging a premium value for advertising slots based on an ability to collect personal information of the viewer.

* * * * *